United States Patent [19]

Tanaka et al.

[11] Patent Number: 4,941,195
[45] Date of Patent: Jul. 10, 1990

[54] OPTICAL CHARACTER READER

[75] Inventors: Hideaki Tanaka, Osaka; Toshiaki Morita, Nara; Minehiro Konya, Osaka, all of Japan

[73] Assignee: Sharp Kabushiki Kaisha, Osaka, Japan

[21] Appl. No.: 333,730

[22] Filed: Mar. 31, 1989

Related U.S. Application Data

[63] Continuation-in-part of Ser. No. 107,041, Oct. 9, 1987, abandoned.

[30] Foreign Application Priority Data

Oct. 27, 1986 [JP] Japan .................. 61-256074

[51] Int. Cl.$^5$ .................. G06K 9/20
[52] U.S. Cl. .................. 382/61; 340/711; 340/731; 382/47
[58] Field of Search .................. 382/44, 47, 61; 340/709, 731, 751; 364/522, 523, 518

[56] References Cited

U.S. PATENT DOCUMENTS

| | | | |
|---|---|---|---|
| 4,078,249 | 3/1978 | Lelke et al. | 340/731 |
| 4,190,835 | 2/1980 | Buynak | 340/711 |
| 4,408,200 | 10/1983 | Bradley | 340/731 |
| 4,428,065 | 1/1984 | DuVall et al. | 340/751 |
| 4,686,522 | 8/1987 | Hernandez et al. | 340/731 |
| 4,725,960 | 2/1988 | Shima et al. | 340/731 |
| 4,751,507 | 6/1988 | Hama et al. | 340/731 |

Primary Examiner—Leo H. Boudreau
Assistant Examiner—Jose L. Couso
Attorney, Agent, or Firm—Flehr, Hohbach, Test, Albritton & Herbert

[57] ABSTRACT

An optical character reader is provided with an input section which includes an image memory for storing image data received through a scanner which scans a document, a reduced image memory for storing reduced image data created by thinning the received image data, an enlarged image memory for storing enlarged image data for displaying an image which is enlarged with reference to a position indicated by a cursor on a display device, and a keyboard or the like through which various input data can be entered and a target area can be specified. With this character reader, the entire layout of the inputted image data can be displayed by using the reduced image data and a selected portion of the display can be enlarged to be visually inspected or recognized by the character reader.

1 Claim, 3 Drawing Sheets

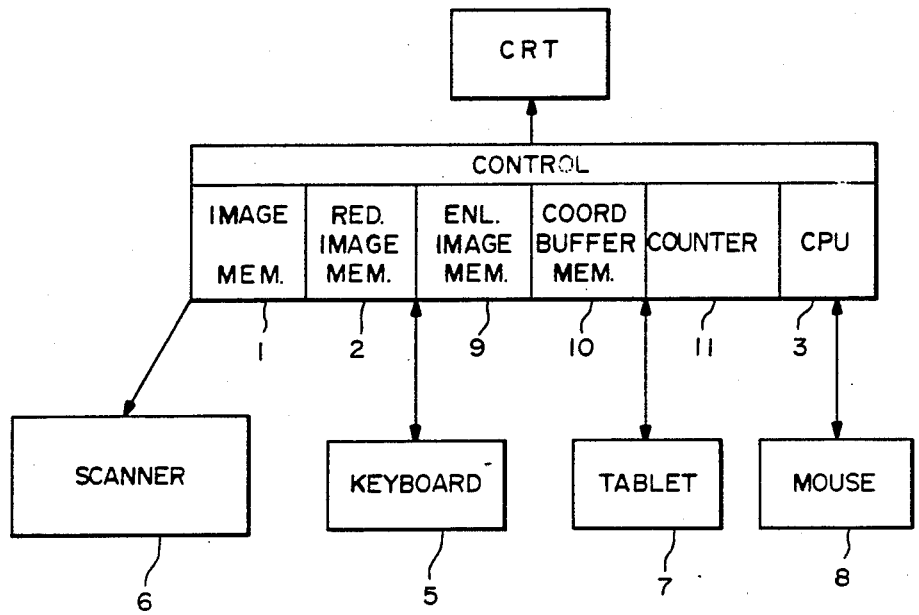
FIG.—1
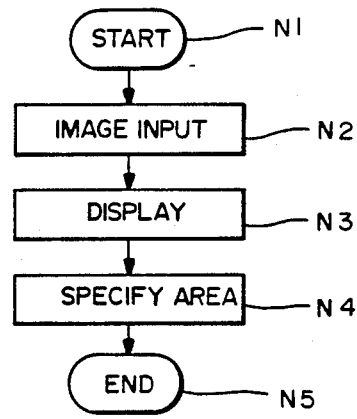
FIG.—2

OPTICAL CHARACTER READER

This is a continuation-in-part, of application Ser. No. 107,041 filed Oct. 9, 1987 now abandoned.

BACKGROUND OF THE INVENTION

This invention relates to an optical character reader (OCR) used as a kind of input device for a word processor, an automatic translator and the like and more particularly to a multi-functional optical character reader with which not only characters within a specified target area of an input image but also its overall format can be studied.

Systems with an optical character reader capable of reading handwritten or printed originals as input device for a word processor, an automatic translator and the like have been considered such that alphanumeric, kana and kanji characters are scanned by a CCD scanner and read by a photoelectric converter device and patterns are recognized by a character recognition device. Such optical character readers have so far been adapted only to directly read and recognize characters on an input sheet and to transmit data thereon to an apparatus such as a word processor and the user could not edit input data with such an optical character reader.

SUMMARY OF THE INVENTION

It is therefore an object of the present invention to provide an optical character reader with improved input means.

It is another object of the present invention to provide an optical character reader capable not only of reducing the entirety of an input image at the time of an input operation such that the overall format can be studied but also of enlarging a section of the input image for display such that its details can be studied.

It is still another object of the present invention to provide an optical character reader as described above with which a target area for a detailed study can be easily specified, for example, by indicating only two points at the ends of its hypotenuse.

The above and other objects of the present invention are achieved by providing an optical character reader for reading an original document by means of an image scanner and recognizing characters from image data inputted by this scanner from a specified area, comprising as input means an image memory for storing the image data inputted from the scanner, a reduced image memory for storing reduced image data obtained by thinning the aforementioned image data, an enlarged image memory for storing enlarged image data obtained, when an enlarged display is specified, with reference to a specified position in the image data, a display device for displaying the reduced image data in the reduced image memory, the enlarged display data in the enlarged image memory, etc., means for specifying and inputting an enlarged display mode of operation and means for setting a target area for a detailed study.

With an optical character reader having such input means, reduced image data based on image data inputted by the image scanner are stored in the reduced image memory and a layout of the entire image data can be displayed on the basis of such reduced image data. When an enlarged display mode of operation is specified from the input means, the data in the enlarged display memory obtained according to the position of the cursor in the display device are displayed. If the user specifies a target area, only the image data related to such a target area are studied for recognition by the reader.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a block diagram for showing the structure of an optical character reader embodying the present invention, FIG. 2 is a flowchart showing the outline of operations by the optical character reader of FIG. 1.

DETAILED DESCRIPTION OF THE INVENTION

Figure 3:
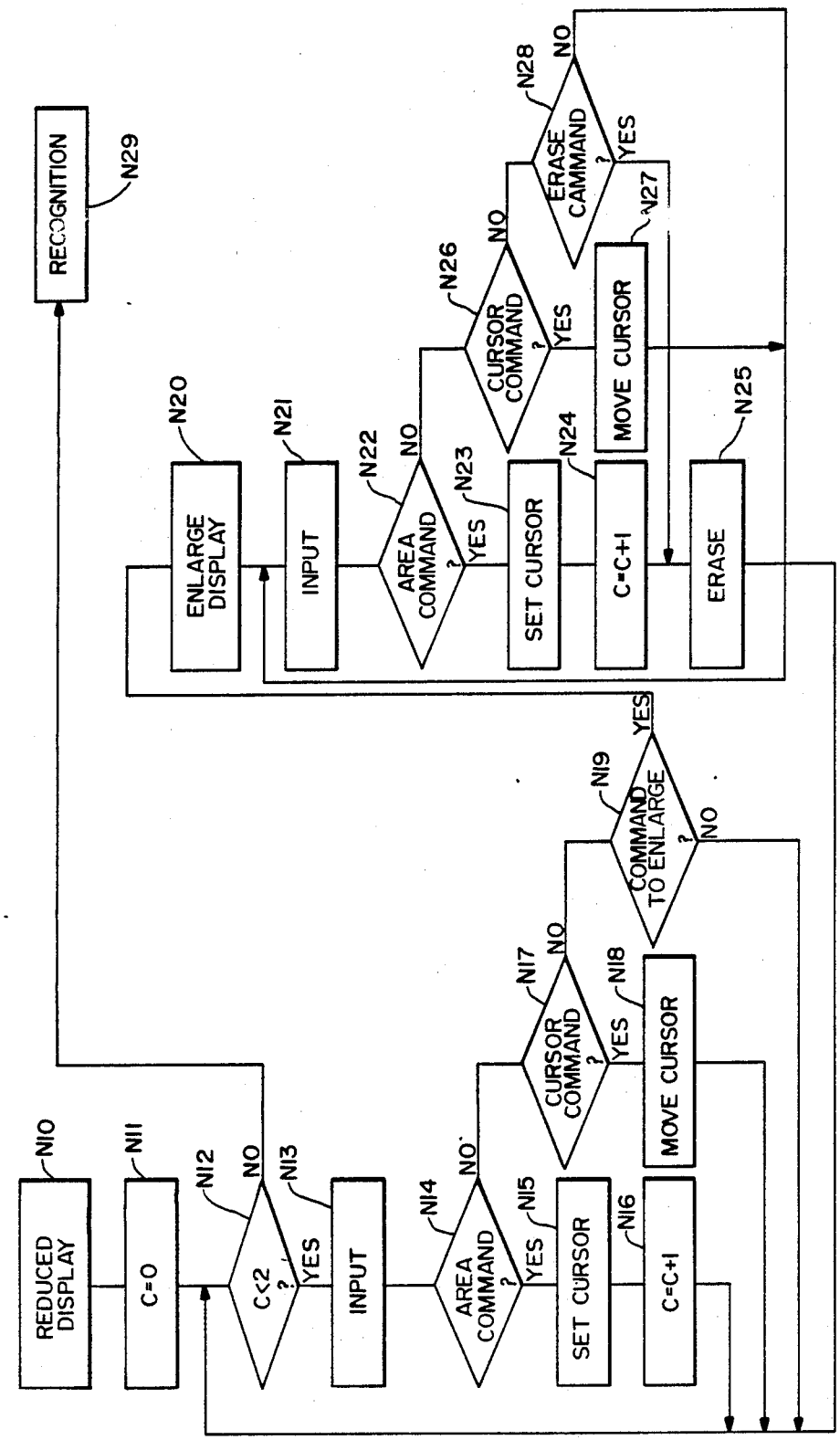
FIG. 3 is a flowchart showing the operation of the optical character reader of FIG. 1.

As shown in FIG. 1 by way of a block diagram, an optical character reader embodying the present invention includes an image scanner 6 as an input means for image data and a keyboard 5 through which various control data can be received. A tablet device 7 and a mouse 8 can also be connected for inputting control data, if necessary. The image scanner 6 is of the type which exposes to light an original document including ordinary printed material such as a book or a magazine and uses a CCD image sensor or the like for photoelectric conversion of the reflected light. The keyboard 5 is provided with function keys for specifying the movement of a cursor, a target area, an enlarged display, etc. and inputting such commands.

The control unit of this optical character reader includes an image memory 1, a reduced image memory 2, a central processing unit (CPU) 3, an enlarged image memory 9, a coordinate buffer memory 10 and a counter C 11. The CPU 3 is for controlling the overall operation including character recognition. There is also provided a display device (CRT) 4 for displaying data such as those in the reduced image memory 2 and the enlarged image memory 9. The display device 4 is so adapted that a user can perform interactive input operations.

Figure 4:
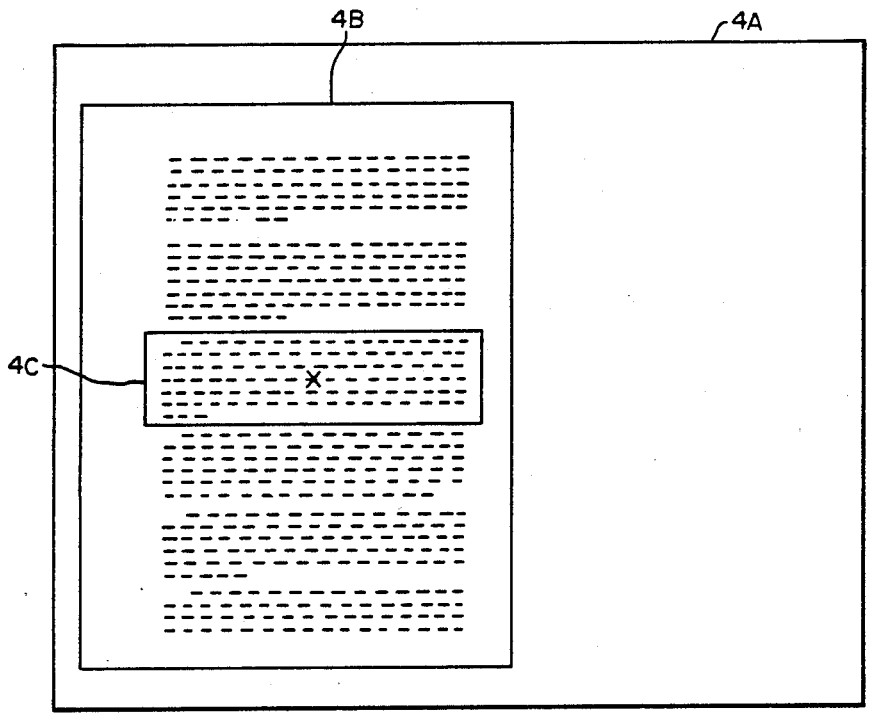
FIG. 4 is an example of displayed layout by reduced image data.

With reference next to FIG. 2, binary image data obtained by using the image scanner 6 to read an original document are transmitted to the image memory 1 and reduced image data obtained by thinning the image data are stored in the reduced image memory 2. The display device 4 now displays the data from this reduced image memory 2 and this is shown in FIG. 4 as an entire layout display. Since the reduced image data are used for this display, the resolution of the display is somewhat inferior but since this display is effected for the purpose of allowing the user to study the general layout, poor resolution causes no problem at all.

If the user desires to study a particular portion of the input image in detail, an enlarged display mode of operation is specified through the input means and, in response thereto, image data for an enlarged display around the position indicated by a cursor are created and stored in the enlarged image memory 9. Data from the enlarged image memory 9 are displayed on the display device 4 to effect an enlarged display as shown, for example, in FIG. 5.

In summary, two kinds of image display can be effected by the optical character reader of the present invention, that is, the layout display by using the data from the reduced image memory 2 and the enlarged display by using the data from the enlarged image memory 9. If the user specifies a target area on the inputted image by specifying the coordinates of two points indicating its hypotenuse, the character reader proceeds to identify the character data within the target area thus specified.

Next, an actual procedure for displaying a reduced image and an enlarged image is described by way of the flowchart of FIG. 3. To start, inputted image data are displayed on the display device 4 by using the data in the reduced image memory 2 such that the entire layout can be studied as shown in FIG. 4. Since the reduced image data are obtained by thinning the inputted original image data, the resolution on the display screen is somewhat poorer but not enough to be a problem for the purpose of ascertaining the layout. In FIG. 4, 4A represents the display screen and 4B indicates the reduced area for displaying the image data of the original document.

After input image data are thus displayed on the display device 4 according to the data stored in the reduced image memory 2 (N10), the counter C 11 is cleared (N11) and the system waits to receive a command (N13). If a command to move the cursor is inputted from the keyboard 5 at this moment (NO in N14 and YES in N17), the cursor is moved in the specified direction such as up, down, right or left (N18) and the system waits for another command (N13). If the next command received from the keyboard 5 is also for moving the cursor, a similar process is repeated. If a command to specify an area is inputted from the keyboard 5 while the system is waiting for a command (YES in N14), the coordinates of the position in the image memory 1 corresponding to the current position of the cursor in the reduced image memory 2 are calculated and the coordinates thus obtained are set in the coordinate buffer memory 10 (N15). The position of the cursor at this point is recorded on the display screen and the counter C 11 is incremented by 1 (N16) to show that one of the two points to define a rectangular target area (by specifying its hypotenuse) has been specified and the system goes back to Step N13 to wait for another command. If another command to move the cursor is inputted at this moment (YES in N17) and the cursor is moved (N18) to the position of the second point for specifying the target area, and if another command to set an area is thereafter inputted (YES in N14), the coordinates of this point are also set in the coordinate buffer memory 10 (N15) and the counter C 11 is further incremented by 1 (N16). Now that the value of the counter C 11 is 2 (YES in N12), this indicates that the specification of the desired rectangular target area have been completed with these two points defining its hypotenuse. Accordingly, a frame showing this target area is displayed as shown at 4C in FIG. 4 and the data inside this frame are analyzed, that is, the characters therein are read.

Figure 5:
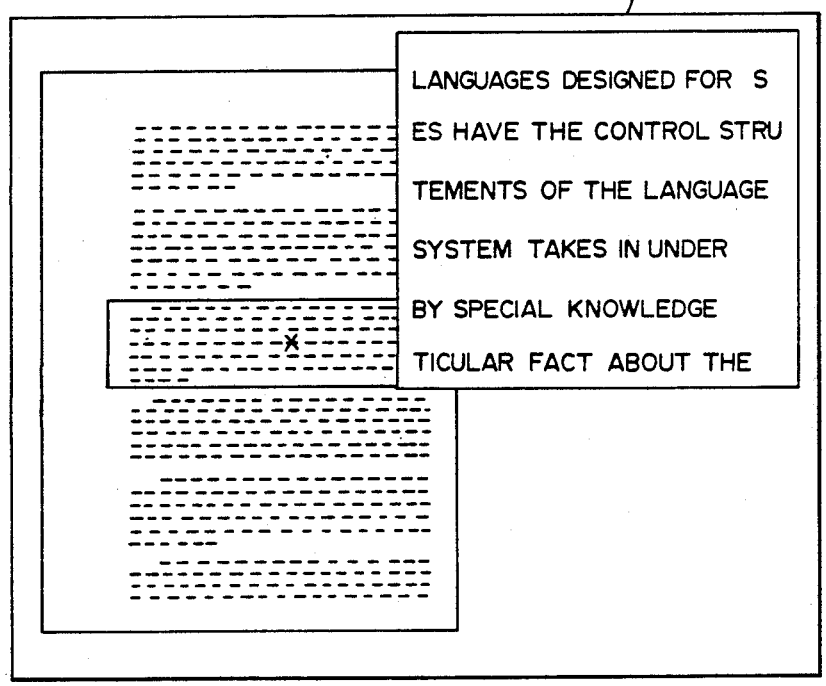
FIG. 5 is an example of displayed enlarged image data.

If a command to effect an enlarged display is received from the keyboard 5 in Step N13 while the system is in a waiting condition (YES in N19), the position in the image memory 1 corresponding to the current cursor position in the reduced image memory 2 is calculated, enlarged display image data are created around this position thus calculated and transmitted to the enlarged image memory 9 and the data in this enlarged image memory 9 are displayed on the display device 4 (N20). At the same time, two cursors are displayed at corresponding positions in the enlarged and reduced image areas as shown in FIG. 5.

Thereafter, the system waits for another command (N21). The subsequent steps N22, N23 and N24 are identical to Steps N14, N15 and N16 described above and after a region has been specified, the enlarged display is erased (N25) if a command to erase the enlarged display is received (YES in N26). If a command to move the curser is received (YES in N27) while the system is in the wait condition (N21) and if the cursor can thereby stay within the area of the enlarged display (NO in N28), the cursor in the enlarged display is moved accordingly (N29) while the cursor in the reduced display is moved to the corresponding position with the same coordinates (N31). If the command to move the cursor is such that the cursor would move beyond the boundary of the display (YES in N28), the enlarged display is scrolled in the direction of the cursor motion (N30) and after the cursor in the reduced display is accordingly moved to the corresponding coordinates (N31), the system again returns to the wait condition (N21).

In summary, after the image scanner 6 receives image data from a document, the user can inspect its overall layout by a reduced image display on the display device 4. Thereafter, if it is desired to ascertain its actual content, the cursor is moved to the position of interest and a command for an enlarged image display is inputted from the keyboard 5. An enlarged display is thereby effected on the display device 4 around the position of the cursor (indicated by a cross in FIGS. 4 and 5) such that the user can visually scrutinize the details of the input data. If it is desired to have the character reader identify characters within a certain rectangular area, on the other hand, the user has only to specify the coordinates of two points to identify its hypotenuse. The character reader thereupon recognizes only the characters within the area thus specified and the characters thus recognized are inputted to the word processor or the automatic translator to which this optical character reader is connected to serve as input means.

The foregoing description of a preferred embodiment of the invention has been presented for purposes of illustration and description. It is not intended to be exhaustive or to limit the invention to the precise form disclosed, and many modifications and variations are possible in light of the above teaching. Any modifications and variations hereof that may be apparent to a person skilled in the art are intended to be included within the scope of this invention.

What is claimed is:

1. In an optical character reader adapted to read a document and thereby input image data by a scanner and to recognize said image data within a specified area, the improvement wherein said optical character reader is provided with input means which include
an image memory for storing said image data inputted by said scanner,
inputting means for inputting an enlarged display command and positions of two area setting points,
control means for creating reduced image data by thinning said inputted image data and, if an enlarged display command is inputted, enlarged display data with reference to a cursor position in said image data, a reduced image memory for storing said reduced image data, an enlarged display memory for storing said enlarged display data, display means having a display area for displaying display data which include said reduced image data and said enlarged display data, cursor moving means for moving a cursor displayed on said display area, and area setting means for receiving positional data on two specified points inputted through said inputting means and setting on said display area a rectangular target area with a hypotenuse having said two specified two points as the end points thereof, said control means being capable of displaying in said display means an entire layout of said inputted image data by using said reduced image data in said reduced image memory, responding to said enlarged display command inputted from said inputting means by displaying on said display means said enlarged display data in said enlarged display memory, a first cursor, and a second cursor, said first and second cursors being displayed at mutually corresponding positions respectively in said enlarged and reduced display data, moving said second cursor, if said first cursor is moved by said cursor moving means, according to the movement of said first cursor, scrolling said enlarged display data on said display means if it is attempted to move said first cursor beyond said display area, and recognizing only those of said image data in said target area specified through said input means.

* * * * *